United States Patent
Hwang

[11] Patent Number: 5,705,900
[45] Date of Patent: Jan. 6, 1998

[54] DYNAMIC FOCUS CIRCUIT

[75] Inventor: Dong Sun Hwang, Kyungsangbuk-Do, Rep. of Korea

[73] Assignee: LG Electronics Inc., Seoul, Rep. of Korea

[21] Appl. No.: 512,530

[22] Filed: Aug. 8, 1995

[30] Foreign Application Priority Data

Aug. 8, 1994 [KR] Rep. of Korea ............. P94-19506

[51] Int. Cl.[6] ............................................. H01J 29/58
[52] U.S. Cl. .................................... 315/382; 348/806
[58] Field of Search ......................... 315/382, 382.1, 315/7; 348/806

[56] References Cited

U.S. PATENT DOCUMENTS 4,555,649  11/1985  Sharma ............................ 315/382
5,091,681  2/1992  Sutton ............................. 315/382
5,512,964  4/1996  Kim ........................... 315/382.1 X Primary Examiner—Robert Pascal
Assistant Examiner—Justin P. Bettendorf
Attorney, Agent, or Firm—Fish & Richardson P.C.

[57] ABSTRACT

A dynamic focus circuit for a cathode ray tube having a curved screen that corrects clearness difference between the central part and the corners of a screen caused by relative distance difference from an electron gun to the screen. This circuit corrects picture deterioration due to the focal length difference, using dynamic voltages included in vertical and horizontal parabolic wave signals.

1 Claim, 4 Drawing Sheets

DYNAMIC FOCUS CIRCUIT

BACKGROUND OF THE INVENTION

1. Field of the Invention

The present invention relates to a focusing circuit for a cathode-ray tube (hereinafter CRT). Particularly, this invention relates to a dynamic focus circuit that corrects focus discord between the central part and the corners of a screen, caused by the difference in relative distance from an electron gun to the screen because of the screen curvature.

2. Description of the Prior Art

FIG. 1 is a schematic diagram of a focus adjustment circuit for supplying a high-voltage generator section, which applies a high voltage to an anode of a CRT, with vertical and horizontal synchronous signals. The circuit is comprised of a horizontal deflection section 21 (having transistors Q1, diodes D1 and D2, and capacitors C13 and C14) for generating a horizontal saw-toothed wave in response to a horizontal synchronous signal which is frequency-separated from a horizontal and vertical synchronous signal amplitude-separated from an image signal; a horizontal deflection yoke 22 for deflecting, according to the saw-toothed wave, an electron beam from an electron gun; a horizontal drive section 23 for controlling the horizontal deflection section 21 by amplifying and shaping a horizontal oscillation wave; and a high-voltage generator section 24 for applying to a primary of a high-voltage transformer (shown as "FBT" in the drawings) a horizontal output pulse obtained by switching a B+ voltage from a power supply, using an output transistor in the horizontal deflection section 21, and for inducing, over a secondary and tertiary side coils, a voltage necessary for a CRT 25 and other circuits.

The operation of such an organized circuit will be described with regard to FIG. 1. When a power source is applied to a primary of the high-voltage generator section 24 according to the switching operation of a transistor Q1 in the horizontal deflection section 21, this voltage is raised (in the case of a color tube, 23–27 kV) at a secondary of the high-voltage generator section 24 and is supplied to an anode cap of the CRT. This induced voltage is then rectified and varied by a focus rheostat VR1 to control grid G3. A second rheostat VR2 controls an acceleration (or screen) grid G2.

This rheostat is adjusted to optimize CRT screen clearness, usually at the final manufacturing process. A focus voltage, at this time, is varied within the range of 4–10 kV dc.

However, in such a conventional focus adjustment circuit, there is focal length difference between the central part and the corners of a screen because the screen has surface curvature. Therefore, however optimally adjusted a focus may be, the focus cannot be adjusted uniformly throughout the screen, and this degrades the picture quality on a CRT. That is to say, if the picture on the central part of the screen is optimized, those at the corners become worse; if the pictures at the corners of the screen is optimized, that on the central part becomes worse.

SUMMARY OF THE INVENTION

The present invention has been developed to overcome such a problem involved in the prior art. It is an object of the present invention to provide a dynamic focus circuit which controls the picture quality by utilizing dynamic voltages included in vertical and horizontal parabolic waves.

To achieve the above object, there is provided a dynamic focus circuit for use in CRT appliances having a vertical deflection yoke, the dynamic focus circuit and a horizontal deflection yoke, comprising:

vertical parabolic wave generator means for integrating a vertical saw-toothed wave provided from said vertical deflection yoke to transform said vertical saw-toothed wave into a vertical parabolic wave;

vertical pre-amplifier means for amplifying said vertical parabolic wave from said vertical parabolic wave generator means;

superimposition means for superimposing the output signal of said vertical pre-amplifier means;

horizontal parabolic wave generator means for transforming a horizontal saw-toothed wave from said horizontal deflection yoke into a horizontal parabolic wave;

horizontal pre-amplifier means for amplifying said horizontal parabolic wave from said horizontal parabolic wave generator means;

main amplifier means for amplifying, with a predetermined amplification factor, said vertical parabolic wave from said vertical parabolic wave generator means and said horizontal parabolic wave from said superimposition means; and high-voltage generator means for inducing a high voltage on its secondary winding in response to a voltage provided to its primary winding from said main amplifier means and providing said induced high voltage to an anode of said CRT.

BRIEF DESCRIPTION OF THE DRAWINGS

The above object and other advantages of the present invention become clearer after a description of the preferred embodiment with reference to the accompanying drawings, in which.

DESCRIPTION OF THE PREFERRED EMBODIMENT

Figure 1:
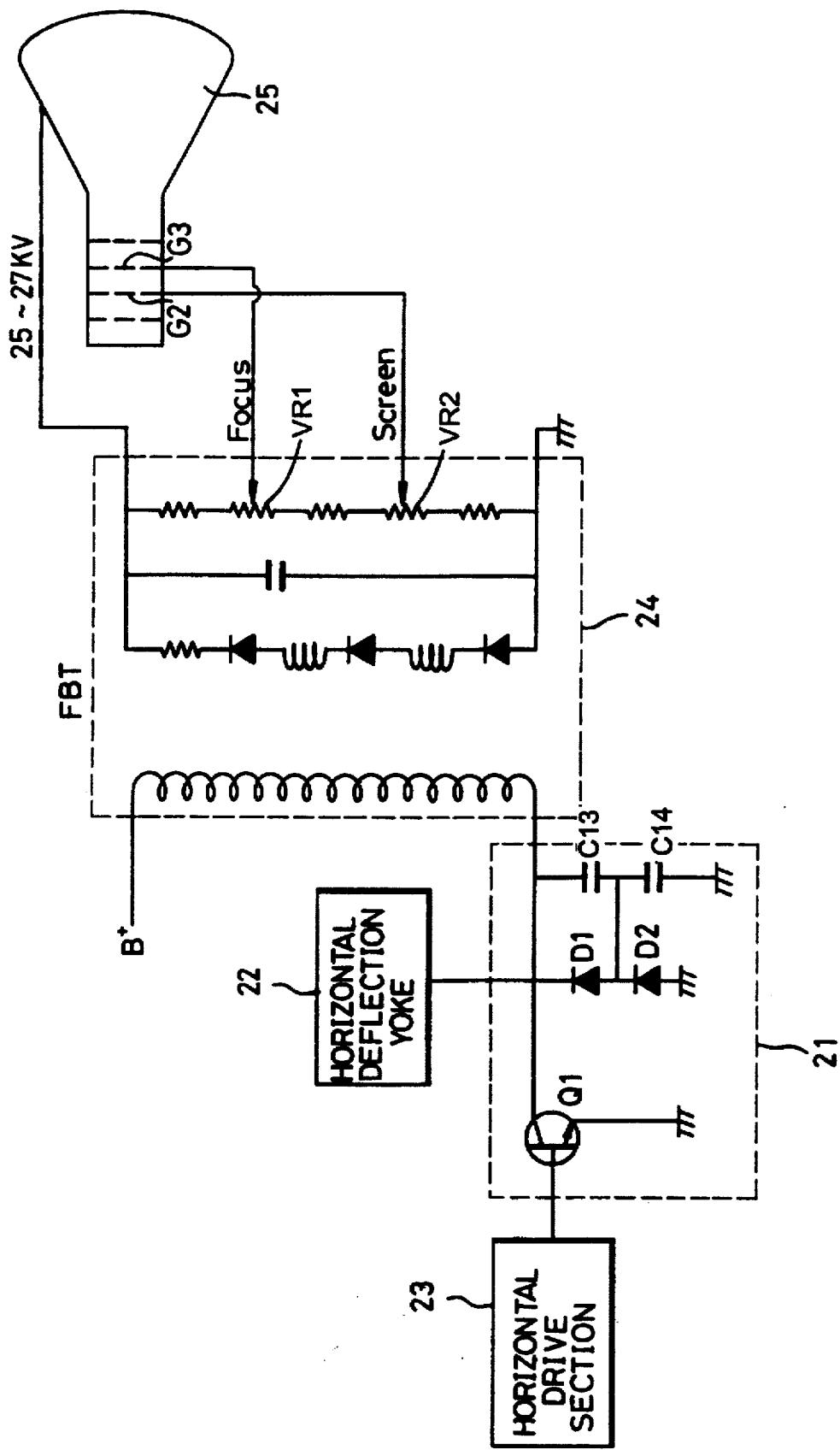
FIG. 1 is a schematic diagram of a conventional focus adjustment circuit.
Figure 2:
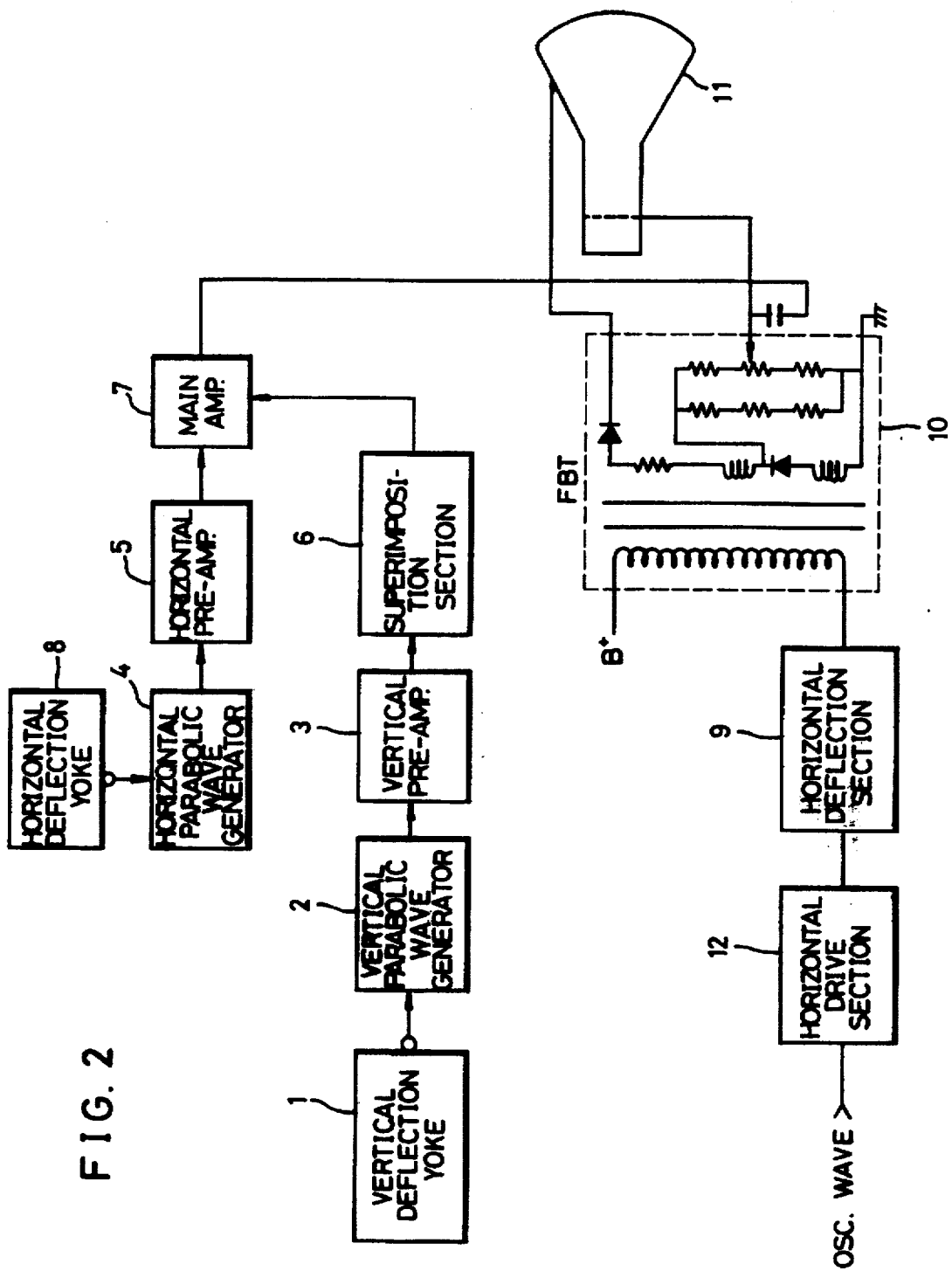
FIG. 2 is a block diagram of a dynamic focus adjustment circuit according to the present invention.
Figure 3:
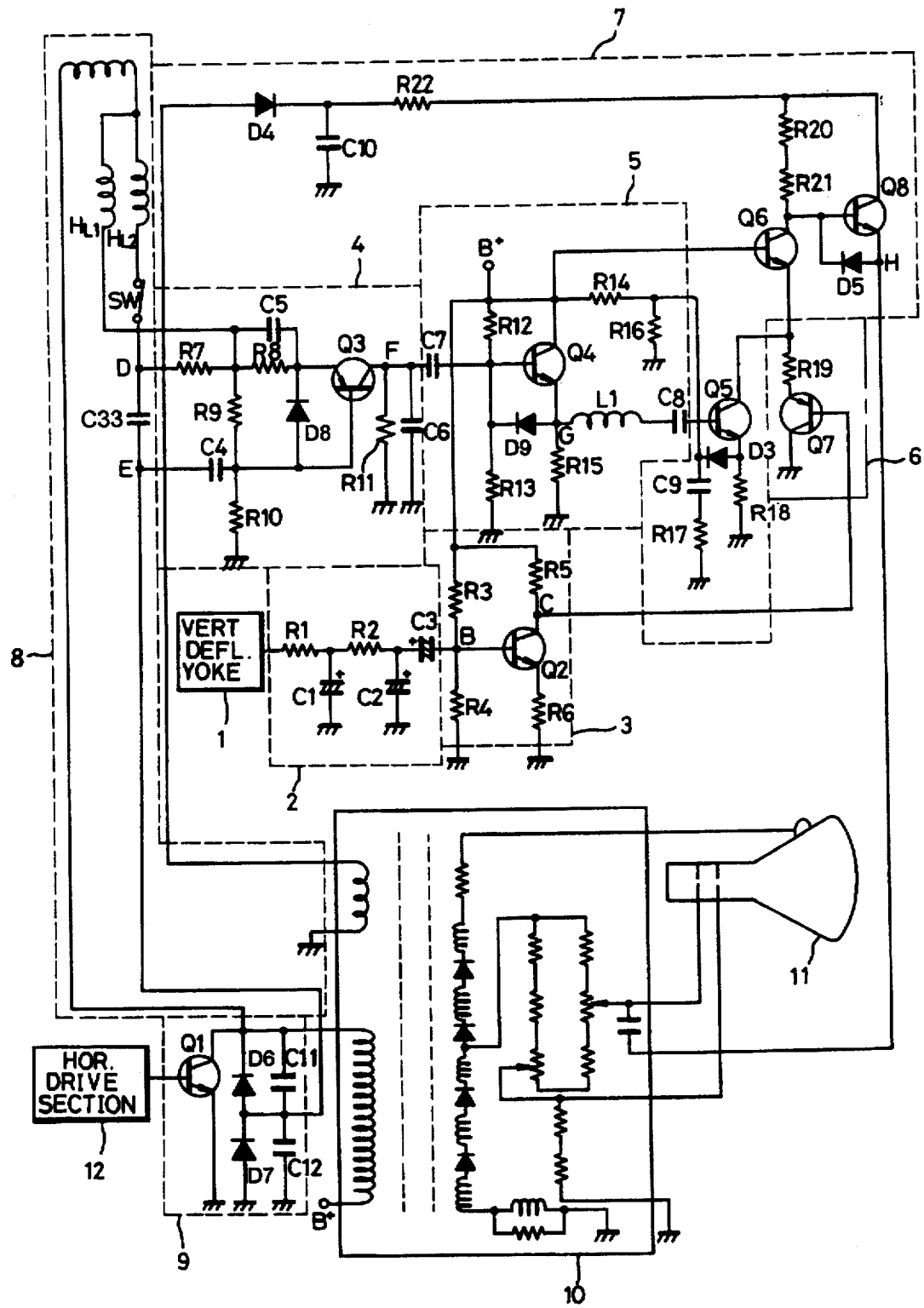
FIG. 3 is a schematic diagram of the block diagram shown in FIG. 2.

FIG. 2 is a block diagram of the present invention, and FIG. 3 is a schematic diagram of the same. As shown, the circuit is comprised of a vertical parabolic wave generator section 2 for generating a vertical parabolic wave in response to a vertical saw-toothed wave from a vertical deflection yoke 1; a vertical pre-amplifier section 3 for amplifying the vertical parabolic wave; a superimposition section 6 for superimposing the output of the vertical pre-amplifier section 3; a horizontal parabolic wave generator section 4 for generating a horizontal parabolic wave in response to a horizontal saw-toothed wave from a horizontal deflection yoke 8; a horizontal pre-amplifier section 5 for amplifying the horizontal parabolic wave; a main amplifier section 7 for amplifying, at a predetermined amplification factor, both the horizontal output of the horizontal pre-amplifier section 5 and the vertical output of the superimposition section 6 to apply to the high-voltage generator section 10; a horizontal deflection section 9 for controlling the horizontal deflection yoke 8 in connection with a primary of the high-voltage generator section 10; and a horizontal drive section 12 for controlling the operation of the horizontal deflection section 9 by amplifying and shaping an external oscillation wave.

Turning to FIG. 3, the vertical parabolic generator section 2 is constituted by a two-stage integration circuit, including resistors R1 and R2 and capacitors C1 to C3, for integration of a vertical deflection signal from the vertical deflection yoke 1.

The vertical pre-amplifier section 3 is constituted by resistors R3 through R6 and a transistor Q2, and the horizontal deflection yoke 8 is constituted by horizontal linearity coils $H_{L1}$ and $H_{L2}$ and capacitor C33.

The horizontal parabolic wave generator 4 is constituted by resistors R7 to R11, capacitors C4 to C6, a diode D8, and a transistor Q3, and the horizontal pre-amplifier section 5 is constituted by capacitors C7 and C8, a diode D9, resistors R12 to R16, a coil L1, and a transistor Q4.

The superimposition section 6 is constituted by a resistor R19 and a transistor Q7, and the main amplifier section 7 is constituted by resistors R17, R18, R20, and R21, capacitors C9 and C10, diodes D3 to D5, and transistors Q5, Q6, and Q8. The horizontal deflection section 9 is constituted by a transistor Q1, diodes D6 and D7, and capacitors C11 and C12.

What follows is the description of the operation and efficiency of such an organized dynamic focus circuit according to the present invention.

Figure 4:
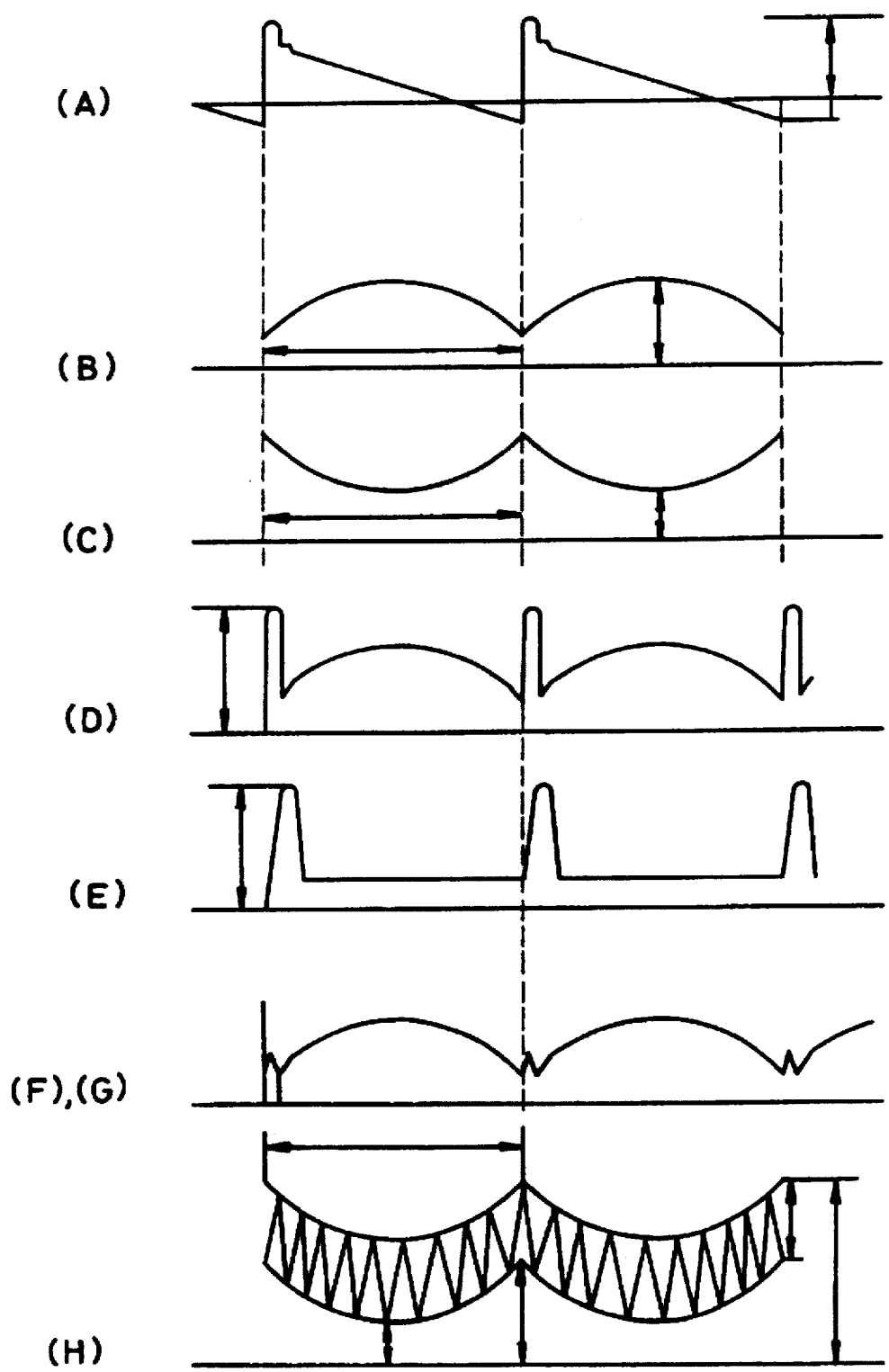
FIGS. 4(A)–(H) show waveforms measured at the points on the circuitry in FIG. 3.

The vertical parabolic wave generator section 2 integrates, using an integration circuit made up of the resistor R1 and capacitor C1 and the resistor R2 and capacitor C2, a vertical deflection wave, like a waveform (A) in FIG. 4, provided from the vertical deflection yoke 1. Thereafter the section 2 provides, through the capacitor C3, a vertical parabolic wave, like a waveform (B) in FIG. 4, to the base of the transistor Q2 which constitutes the vertical pre-amplifier section 3.

The transistor Q2 plays a part of an amplifier, being biased by the resistors R3 to R6. The transistor Q2 amplifies inversely the vertical parabolic wave inputted to a point B in FIG. 3, and provides a waveform (C) in FIG. 4 to the base of the transistor Q7. In the mean time, the signal at the point B of the vertical pre-amplifier section 3 is applied to the collector of the transistor Q3 in the horizontal parabolic wave generator section 4.

The horizontal parabolic wave generator section 4 receives signals like waveforms (D) and (E) in FIG. 4 from the tuning capacitors C11 and C12 and the horizontal linearity coils $H_{L1}$ and $H_{L2}$, and applies the signals to the emitter of the transistor Q3.

A switch SW in the horizontal deflection yoke 8 is switched on or off according to a frequency to correct linearity. A diode D8, connected across the base and emitter of the transistor Q3 in the horizontal parabolic wave generator section 4, is called a protective diode to protect the overvoltage from being imposed across the transistor Q3.

A waveform (F) in FIG. 4 from the horizontal parabolic wave generator section 4 is applied to the base of the transistor Q4 in the horizontal pre-amplifier section 5 to be amplified. At a point G the emitter of the transistor Q4, a horizontal parabolic wave analogous to the waveform (F) measures.

The main amplifier section 7, which receives the horizontal parabolic wave like a waveform (G) from the horizontal pre-amplifier section 4 and receives the vertical parabolic wave like the waveform (C) from the superimposition section 6, outputs a dynamic focus signal like a waveform (H) in FIG. 4, using a two-stage amplifier formed by the transistors Q5 and Q6. As a voltage source for the main amplifier section 7, a part of the voltage induced at the high-voltage generator section 10 is used after rectified by the diode D4 and the capacitor C10.

The dynamic focus signal varies, through a capacitor, a dynamic focus rheostat in the high-voltage generator section 10 to adjust finely the focus on the central part of a screen. The foci at the corners of the screen can be adjusted by varying the horizontal and vertical dynamic voltage at the point H, using a static focus rheostat. Thus the CRT 11 is illustrated as a five grid CRT with connections to the static focus grid and the dynamic focus grid.

From the foregoing, the dynamic focus circuit of this invention, in a television receiver or a computer monitor adopting a CRT, makes it possible to adjust the focus throughout the screen by using dynamic voltages (horizontally 300V or so; vertically 150V or so) included in horizontal and vertical parabolic waves, complying with a market trend to require large-sized products and high picture quality. The circuit improves the overall picture quality, as a result.

What is claimed is:

1. A dynamic focus circuit for use in CRT appliances having a vertical deflection yoke and a horizontal deflection yoke, the dynamic focus circuit comprising:

a vertical parabolic wave generator for integrating a vertical saw-toothed wave provided from said vertical deflection yoke to transform said vertical saw-toothed wave into a vertical parabolic wave;

a vertical pre-amplifier for amplifying said vertical parabolic wave from said vertical parabolic wave generator means;

a superimposition circuitry for superimposing the output signal of said vertical pre-amplifier;

a horizontal parabolic wave generator for transforming a horizontal saw-toothed wave from said horizontal defection yoke into a horizontal parabolic wave;

a horizontal pre-amplifier for amplifying said horizontal parabolic wave from said horizontal parabolic wave generator means;

a main amplifier for amplifying, with a predetermined amplification factor, said vertical parabolic wave from said superposition circuitry and said horizontal parabolic wave from said horizontal pre-amplifier to generate a dynamic focus signal; and a high voltage generator having a primary and a secondary winding for inducing a high voltage on the secondary winding in response to a voltage provided to the primary winding providing said induced high voltage to an anode of a CRT and for applying said dynamic focus signal to a dynamic focus grid of said CRT, and said high voltage generator further having a voltage divider having a variable resistance circuit for providing a first and a second varying voltage from said voltage divider, said voltage divider being connected across the secondary winding, whereby said first voltage is applied to a static focus grid and said dynamic focus signal is AC coupled to said second voltage and is applied to said dynamic focus grid of the CRT.

* * * * *